United States Patent [19]
Choi

[11] Patent Number: 6,156,820
[45] Date of Patent: Dec. 5, 2000

[54] POLYAMIDEIMIDESILOXANE HOT MELT ADHESIVE

[75] Inventor: Jin-O Choi, Getzville, N.Y.

[73] Assignee: Occidental Chemical Corporation, Dallas, Tex.

[21] Appl. No.: 09/221,497

[22] Filed: Dec. 28, 1998

[51] Int. Cl.$^7$ ...................................................... C09J 4/00
[52] U.S. Cl. ............................................................ 523/176
[58] Field of Search .............................................. 523/176

[56] References Cited

U.S. PATENT DOCUMENTS

| | | | |
|---|---|---|---|
| 4,675,367 | 6/1987 | Policastro | 525/474 |
| 4,829,131 | 5/1989 | Lee | 525/426 |
| 5,237,034 | 8/1993 | Im et al. | 528/26 |
| 5,258,461 | 11/1993 | Facci | 525/165 |
| 5,714,572 | 2/1998 | Kato | 528/310 |

FOREIGN PATENT DOCUMENTS

| | | | |
|---|---|---|---|
| 06345866 | 12/1994 | Japan | C08G 73/10 |

OTHER PUBLICATIONS

Dezern, "Synthesis and Characterization of Polyamide–Imides," *Polymer Engineering and Science*, vol. 31, No. 12 (1991).

*Primary Examiner*—Paul R. Michl
*Attorney, Agent, or Firm*—Richard D. Fuerle; Anne E. Brookes

[57] ABSTRACT

Disclosed is a solution of a hot melt adhesive which comprises an organic solvent and a fully imidized polyamide-imidesiloxane. The polyamideimidesiloxane is the reaction product of dianhydride monomer with diamine monomer. About 0.5 to about 30 mole % of the monomers are siloxane-containing diamine or dianhydride monomers. Up to about 50 mole % of the diamine monomer is aliphatic diamine that contains neither siloxane groups nor amide linkages, and about 40 to about 99 mole % of the diamine monomer is aromatic diamine that does not contain siloxane groups. The aromatic diamine is (1) about 50 to about 100 mole % unsymmetrical aromatic diamine that has at least two aromatic rings, two amine groups on different aromatic rings, and contains an amide linkage in the chain and (2) up to about 50 mole % of aromatic diamine that contains neither siloxane groups nor amide linkages. A tape is made by forming a coating of the solution on a film. An article can be attached to a substrate by applying the tape to the substrate or the article, heating the tape above its softening point, and pressing the article or substrate, respectively, into the tape.

20 Claims, No Drawings

POLYAMIDEIMIDESILOXANE HOT MELT ADHESIVE

BACKGROUND OF THE INVENTION

This invention relates to a polyamideimidesiloxane and to its use as a hot melt adhesive. In particular, it relates to such an adhesive where the diamine forming the amide linkage is unsymmetrical and the polyamideimidesiloxane is fully imidized in solution before it is used as an adhesive.

Polyamideimidesiloxanes have been disclosed for use as hot melt adhesives for microelectronic assembly. A solution is formed of the polyamic acid precursor, the solution is applied to a substrate, the solvent is evaporated, and the polyamic acid is imidized on the substrate.

SUMMARY OF THE INVENTION

I have discovered that an excellent adhesive for bonding microelectronic components can be made from a polyamideimidesiloxane, where the aromatic diamine that forms the amide linkages is unsymmetrical. Also, in the adhesive of this invention a solution is formed of a fully imidized polyamideimidesiloxane so that very little imidization occurs on the substrate—there is no imidization step on the assembly line. The adhesive of this invention also forms a good fillet around components pressed into it.

DESCRIPTION OF THE PREFERRED EMBODIMENTS

The polyamideimidesiloxane of this invention is the reaction product of a dianhydride monomer with a primary diamine monomer. Any dianhydride or combination of dianhydrides can be used as the dianhydride monomer, although aromatic dianhydrides are preferred as they give superior properties. Examples of suitable dianhydrides include:

1,2,5,6-naphthalene tetracarboxylic dianhydride;
1,4,5,8-naphthalene tetracarboxylic dianhydride;
2,3,6,7-naphthalene tetracarboxylic dianhydride;
2-(3',4'-dicarboxyphenyl) 5,6-dicarboxybenzimidazole dianhydride;
2-(3',4'-dicarboxyphenyl) 5,6-dicarboxybenzoxazole dianhydride;
2-(3',4'-dicarboxyphenyl) 5,6-dicarboxybenzothiazole dianhydride;
2,2',3,3'-benzophenone tetracarboxylic dianhydride;
2,3,3',4'-benzophenone tetracarboxylic dianhydride;
3,3',4,4'-benzophenone tetracarboxylic dianhydride (BTDA);
2,2',3,3'-biphenyl tetracarboxylic dianhydride;
2,3,3',4'-biphenyl tetracarboxylic dianhydride;
3,3',4,4 '-biphenyl tetracarboxylic dianhydride (BPDA);
bicyclo-[2,2,2]-octen-(7)-2,3,5,6-tetracarboxylic-2,3,5,6-dianhydride;
thio-diphthalic anhydride;
bis(3,4-dicarboxyphenyl) sulfone dianhydride;
bis(3,4-dicarboxyphenyl) sulfoxide dianhydride;
bis(3,4-dicarboxyphenyl oxadiazole-1,3,4) paraphenylene dianhydride;
bis(3,4-dicarboxyphenyl) 2,5-oxadiazole 1,3,4-dianhydride;
bis[2,5-(3',4'-dicarboxydiphenylether)] 1,3,4-oxadiazole dianhydride;
bis(3,4-dicarboxyphenyl) ether dianhydride or 4,4'-oxydiphthalic anhydride (ODPA);
bis(3,4-dicarboxyphenyl) thioether dianhydride;
ethylene glycol bis(anhydro-trimellitate);
5,5'-(1-methylethylidene)bis(1,3-isobenzofurandione) or 4,4'-[isopropylidene bis(p-phenyleneoxy)] diphthalic anhydride or bisphenol A dianhydride (BPADA);
bisphenol S dianhydride;
2,2-bis(3,4-dicarboxyphenyl) hexafluoropropane dianhydride or 5,5-[2,2,2-trifluoro-1-(trifluoromethyl) ethylidene] bis(1,3-isobenzofurandione) (6FDA);
hydroquinone bisether dianhydride;
bis (3,4-dicarboxyphenyl) methane dianhydride;
cyclopentadienyl tetracarboxylic acid dianhydride;
cyclopentane tetracarboxylic dianhydride;
ethylene tetracarboxylic acid dianhydride;
perylene 3,4,9,10-tetracarboxylic dianhydride;
pyromellitic dianhydride (PMDA);
tetrahydrofuran tetracarboxylic dianhydride; and
resorcinol dianhydride.

The preferred dianhydrides are ODPA and BPADA as polyamideimidesiloxanes made from them are more soluble. The dianhydrides can be used in the tetraacid form or as mono, di, tri, or tetraesters of the tetraacid, but the dianhydride form is preferred as it is more reactive.

About 0.5 to about 30 mole % of the monomers used to make the polyamideimidesiloxane contain siloxane groups. If more or less siloxane monomer is used, the polymer may have less adhesion. Preferably, about 1 to about 20 mole % of the monomers contain siloxane groups. The siloxane-containing monomer can be either a siloxane dianhydride or a siloxane diamine or a mixture thereof, but siloxane diamines are preferred as they are commercially available and less expensive. Examples of siloxane-containing diamines that can be used have the formula

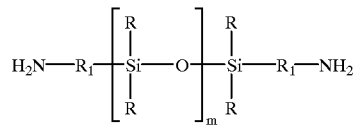

Examples of siloxane-containing dianhydrides that can be used have the formula

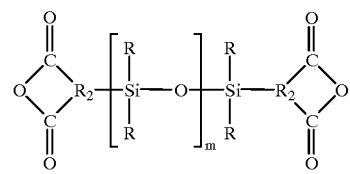

where R, $R_1$, and $R_2$ are mono, di, and triradicals, respectively, each independently selected from a substituted or unsubstituted 1 to 12 carbon atom aliphatic group or a substituted or unsubstituted 6 to 10 carbon atom aromatic group and m is 1 to 200. Examples of monoradicals include —$CH_3$, —$CF_3$, —CH=$CH_2$, —$(CH_2)_nCF_3$, —$C_6H_5$, —$CF_2$—CHF—$CF_3$, and —$CH_2CH_2$—CO—O—$CH_2CF_2CF_2CF_3$. Examples of diradicals include —$(CH_2)_n$—, —$(CH_2)_nCF_2$— and —$C_6H_4$—, where n is 1 to 10. Examples of triradicals include =CH—$CH_2$—,

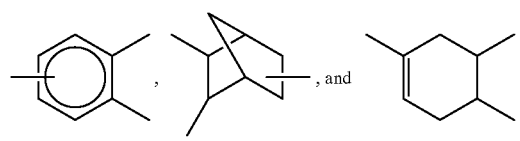

R and $R_1$ are preferably aliphatic from $C_1$ to $C_{10}$ and more preferably R is alkyl from $C_1$ to $C_4$ and $R_1$ is alkylene from $C_1$ to $C_4$. Still more preferably, R is methyl and $R_1$ is propyl;

m is preferably 1 to 12 and is most preferably 1. The preferred siloxane diamines form more flexible coatings and films. Preferred siloxane diamines are herein referred to as "$G_m$."

For good thermal stability, about 40 to about 99 mole % of the non-siloxane diamine monomers are aromatic diamine monomers, and preferably about 80 to about 99 mole % of the non-siloxane diamine monomers are aromatic diamines. About 50 to about 100 mole % of the non-siloxane aromatic diamine is an unsymmetrical aromatic diamine.

The unsymmetrical aromatic diamine has at least two aromatic rings, two amine group attached to different aromatic rings, at least one amide group in its chain, and is unsymmetrical. "Unsymmetrical" means that at least one of the amine groups is ortho or meta or, if both amine groups are para, that there are other aromatic substitutions so that when the two amine groups are reacted with dianhydrides to form two imide groups, the structure on one side of a line joining those two imide groups is not identical to the structure on the other side of the line (ignoring the amide group). This unsymmetrical structure is required to make the polymer soluble after it has been fully imidized. Examples of unsymmetrical aromatic diamines include 3,3'-diaminobenzanilide (3.3'-DABAN), 4,3'-diaminobenzanilide (4,3'-DABAN), 3,4'-diaminobenzanilide, isophthal (3-aminoanilide), isophthal (4-aminoanilide), terphthal (3-aminoanilide), N,N'-m-phenylene-bis(3-aminobenzamide), and N,N'-m-phenylene-bis(4-aminobenzamide); 4,4'-diaminobenzanilide is an example of a symmetrical aromatic diamine. The three benzanilide diamines are preferred because they form more soluble polymers; 3,3'-diaminobenzanilide is especially preferred.

While preferably all of the non-siloxane aromatic diamine monomer is the unsymmetrical aromatic diamine, up to about 50 mole % of the aromatic diamine monomer can be aromatic diamine that contains neither a siloxane group nor an amide linkage. Examples of such diamines include 3,4'-oxydianiline, 4',3-oxydianiline, 3,3'-oxydianiline, 1,3'-bis (3-amino phenoxy)benzene (APB), and 2,2'-bis[4(4-aminophenoxy)phenyl] propane (BAPP).

Preferably, no aliphatic diamine is present (other than siloxane-containing diamine), but up to about 50 mole % of the diamine monomer can be aliphatic diamine that contains neither a siloxane group nor an amide linkage. Examples of such diamines include $H_2N(CH_2)_pNH_2$ and $H_2N(CH_2-CHCH_3-O)_p-CHCH_3-NH_2$, where p is 4 to 100. Another example is a 36 carbon diamine having 2 terminal primary amine groups sold by Henkel Corporation as "Versamine 552."

While it is preferably not used, up to about 10 mole % (based on moles of polymer) of an end capper, such as trimellitic anhydride or phthalic anhydride, can be included to control molecular weight.

The polyamideimidesiloxane is prepared by forming a solution in an organic solvent of dianhydride and diamine monomers. Stoichiometric proportions, ±5 mole %, can be used. Examples of suitable solvents include N-methyl pyrrolidinone (NMP), dimethylacetamide, dimethyl formamide, tetrahydrofuran, diglyme, triglyme, and γ-butyrolactone. NMP is preferred because the polymers are more soluble in it and it forms a good film. The solution should be about 10 to about 40 wt % solids as it is difficult to form a solution with less solvent and more solvent is usually unnecessary. Preferably, the solution is about 20 to about 30 wt % solvent.

When the monomers are mixed together at room temperature (RT) a polyamic acid forms in an exothermic reaction. About 20 to about 40 wt % (based on solvent weight) of a refluxing solvent, such as toluene or xylene, is added to the solution of the polyamic acid and the solution is refluxed for several hours to fully imidize the polyamideimidesiloxane. The polymer is fully imidized when at least 90% of the amic acid groups have imidized. This solution should be about 10 to about 40 wt % polyamide-imidesiloxane and is preferably about 20 to about 30 wt % polyamideimidesiloxane.

The solution of the fully imidized polyamideimidesiloxane is cooled and is applied to a substrate. Suitable substrates include polyimide film, copper film, aluminum film, and other metal films. One or both sides of the substrate can be coated to form a lead-on-chip (LOC) tape. Alternatively, a release film, such as a polyester film, can be coated on one side so that, after evaporation of the solvent, an adhesive polyamideimidesiloxane film can be pulled off the release film. Baking at a temperature of about 200 to about 250° C. will remove the solvent. The coating or the free-standing film is preferably about 10 to about 100 μm thick. It is non-tacky and can be rolled up if desired.

The coating or film is heated above its softening point (typically 150 to 400° C.) and the articles to be bonded are pressed against it. The adhesive is useful in microelectronics fabrication for bonding articles such as semiconductor dies and lead frames. It is especially useful for making 3-layer LOC tapes. The lead fingers of a lead frame can be pressed into the adhesive on one side of the LOC tape and semiconductor dies can be pressed into the adhesive on the other side. When a device is pressed into the adhesive, a fillet or ridge of adhesive forms around the device to help secure it.

The following examples further illustrate this invention.

EXAMPLE 1

A 3-necked glass reactor, equipped with a mechanical stirrer and a Dean & Stark receiver having a condenser, was purged with dry nitrogen. To this reactor was added with stirring 45.5 g (0.2 mol) 4,3'-DABAN 12.6 g (0.05 mol) 1,3-bis(3-aminopropyl)-1,1,3,3-tetramethylsiloxane ($G_1$) 400 g NMP, and 77.5 g (0.25 mol) ODPA. The mixture was polymerized at room temperature overnight, forming a polyamic acid. For azeotropic distillation, 100 g of toluene was added to the polyamic acid solution. The temperature was raised to 150° C. for 3 to 4 hours to imidize the polyamic acid. After imidizaton, the toluene was distilled off.

The fully imidized resin was soluble in NMP at room temperature (RT). The resin solution was coated onto a polyester film and the solvent was dried at 230° C. The glass transition temperature (Tg) by Differential Scanning Calorimeter (DSC) was 244° C.

The resin solution was also coated onto both sides of "Upilex" or "Kapton" polyimide film and the NMP was removed at 230° C. The three-layer LOC tape was attached to an Alloy 42 lead frame at 370° C. by hot pressing. Good fillets appeared around the lead fingers. The semiconductor die was attached to the other side of the tape on the lead frame at 400° C. Bonding to the chip surface and to the lead frame was excellent.

EXAMPLES 2 AND 3

Copolyimides of ODPA with diaminobenzanilde isomers and $G_1$ were prepared using the procedure described in Example 1.

| Example | Aromatic Diamine | mole % $G_1$ | Tg, °C. (DSC) | Solubility in NMP at RT |
|---|---|---|---|---|
| 2 | 80 mole % 3,4'-DABAN | 20 | 226 | Soluble |
| 3 | 90 mole % 3,3'-DABAN | 10 | 232 | Soluble |

Each of the resin solutions was coated onto both sides of "Upilex" polyimide film and the solvent was driven out at 240° C. The 3-layer LOC tapes were attached to Alloy 42 lead frame at 370° C. by hot pressing. Good fillets appeared around the lead fingers. A semiconductor die was attached to the other side of the tape at 420° C. Both films showed good bonding to the chip and lead frame.

EXAMPLE 4, 5, AND 6

Copolyimides of BPADA with 80 mole % diaminobenzanilide isomers and $G_1$ were prepared using the procedure described in Example 1.

| Example | Aromatic Diamine | mole % $G_1$ | Tg, °C. (DSC) | Solubility in NMP at RT |
|---|---|---|---|---|
| 4 | 3,4'-DABAN | 20 | 202 | Soluble |
| 5 | 3,3'-DABAN | 20 | 192 | Soluble |
| 6 | 4,4'-DABAN | 20 | — | Not soluble |

The solutions of Examples 4 and 5 were coated onto both sides of "Upilex" polyimide film and baked at 250° C. to remove the solvent. The 3-layer adhesive films were attached to an Alloy 42 lead frame at 350° C. by hot pressing. Good fillets appeared around the lead fingers. The semiconductor die was attached to the other side of the adhesive film at 400° C. by hot pressing. The chip and lead frame had good adhesion to the adhesive film.

I claim:
1. A solution of a hot melt adhesive comprising
   (I) an organic solvent; and
   (II) a fully imidized polyamideimidesiloxane which comprises the reaction product of dianhydride monomer with diamine monomer, where
   (A) about 0.5 to about 30 mole % of said monomers contain siloxane groups and are siloxane dianhydrides having the general formula

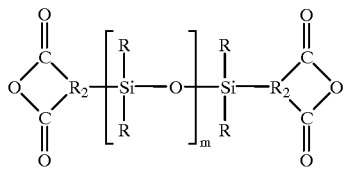

or siloxane diamines having the general formula

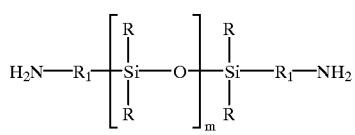

or mixtures thereof, where R, $R_1$, and $R_2$ are mono, di, and triradicals, respectively, each independently selected from a substituted or unsubstituted 1 to 12 carbon atom aliphatic group or a substituted or unsubstituted 6 to 10 carbon atom aromatic group, and m is 1 to 200;
   (B) up to about 50 mole %, based on said diamine monomer, of aliphatic diamine that contains neither siloxane groups nor amide linkages; and
   (C) about 40 to about 99 mole %, based on said diamine monomer, of aromatic diamine that does not contain siloxane groups, selected from the group consisting of
      (1) about 50 to about 100 mole %, based on said aromatic diamine, of unsymmetrical aromatic diamine that has at least two aromatic rings, two amine groups on different aromatic rings, and contains at least one amide linkage in its chain; and
      (2) up to about 50 mole %, based on said aromatic diamine, of aromatic diamine that contains neither siloxane groups nor amide linkages.
2. A solution according to claim 1 wherein said dianhydride monomer is 4,4'-oxydiphthalic anhydride.
3. A solution according to claim 1 wherein said dianhydride monomer is bisphenol A dianhydride.
4. A solution according to claim 1 wherein m is 1 to 12.
5. A solution according to claim 1 wherein R is $CH_3$.
6. A solution according to claim 1 wherein $R_1$ is $-(CH_2)_3-$.
7. A solution according to claim 1 wherein said unsymmetrical aromatic diamine is 3,3'-diaminobenzanilide.
8. A solution according to claim 1 wherein said unsymmetrical aromatic diamine is 3,4'-diaminobenzanilide.
9. A solution according to claim 1 wherein said unsymmetrical aromatic diamine is 4,3'-diaminobenzanilide.
10. A solution according to claim 1 wherein said organic solvent is N-methyl pyrrolidinone.
11. A method of making a tape comprising forming a coating by applying a solution according to claim 1 to a film and evaporating said organic solvent from said solution.
12. A method according to claim 11 wherein said film is a release film and said coating is removed from said release film.
13. A method according to claim 11 wherein said coating is about 15 to about 50 μm thick.
14. A method according to claim 11 wherein said solution is applied to both sides of said film, producing a three-layer tape.
15. A method of attaching an article to a substrate comprising placing said article or said substrate against one side of a tape made according to the method of claim 14, heating said tape above its softening point, and pressing said substrate or said article, respectively, against the other side of said tape.
16. A solution of a hot melt adhesive comprising
   (I) an organic solvent; and
   (II) about 10 to about 40 wt % of a fully imidized polyamideimidesiloxane which comprises the reaction product of
      (A) dianhydride selected from the group consisting of 4,4'-oxydiphthalic anhydride, bisphenol A dianhydride, and mixtures thereof; and
      (B) diamine which comprises
         (1) about 1 to about 20 mole %, based on moles of monomer, of siloxane diamine having the general formula

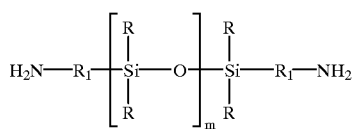

where R is alkyl from $C_1$ to $C_4$, $R_1$ is alkylene from $C_1$ to $C_4$, and m is 1 to 12; and (2) about 80 to about 99 mole %, based on total diamine monomer, of aromatic diamine selected from the group consisting of 3,3'-diaminobenzanilide, 4,3'-diaminobenzanilide, 3,4'-diaminobenzanilide, and mixtures thereof.

17. A solution according to claim 16 wherein said aromatic diamine is 3,3'-diaminobenzanilide.

18. A solution according to claim 16 wherein said solvent is N-methyl pyrrolidinone.

19. A solution according to claim 16 wherein said dianhydride is bisphenol A dianhydride.

20. A solution of a hot melt adhesive comprising (I) an organic solvent selected from the group consisting of N-methyl pyrrolidinone, dimethylacetamide, dimethyl formamide, and tetrahydrofuran;

(II) about 20 to about 30 wt % of a fully imidized polyamideimidesiloxane which comprises the reaction product of (A) a dianhydride selected from the group consisting of 4,4'-oxydiphthalic anhydride, bisphenol A dianhydride, and mixtures thereof; and (B) diamine which comprises (1) about 1 to about 20 mole %, based on moles of monomer, of siloxane diamine having the general formula

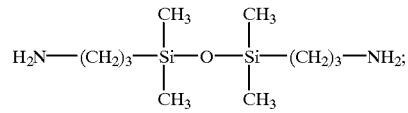

and (2) about 80 to about 99 mole %, based on diamine monomer, of aromatic diamine selected from the group consisting of 3,3'-diaminobenzanilide, 3,4'-diaminobenzanilide, 4,3'-diaminobenzanilide, and mixtures thereof.

* * * * *